US009505124B2

(12) United States Patent
Greenblatt et al.

(10) Patent No.: US 9,505,124 B2
(45) Date of Patent: Nov. 29, 2016

(54) BICYCLE SERVICE KITS

(71) Applicant: Everlast Climbing Industries, Inc., Mendota Heights, MN (US)

(72) Inventors: Joel Greenblatt, Wauwatosa, WI (US); Andrew Patrick Kennedy Lageson, Minneapolis, MN (US)

(73) Assignee: EVERLAST CLIMBING INDUSTRIES, INC., Mendota Heights, MN (US)

( * ) Notice: Subject to any disclaimer, the term of this patent is extended or adjusted under 35 U.S.C. 154(b) by 0 days.

(21) Appl. No.: 14/746,032

(22) Filed: Jun. 22, 2015

(65) Prior Publication Data

US 2015/0283695 A1 Oct. 8, 2015

Related U.S. Application Data

(62) Division of application No. 13/842,491, filed on Mar. 15, 2013, now Pat. No. 9,095,973.

(51) Int. Cl.

| | |
|---|---|
| ***F16L 3/00*** | (2006.01) |
| ***B25H 5/00*** | (2006.01) |
| ***B25H 3/04*** | (2006.01) |

(52) U.S. Cl.
CPC . *B25H 5/00* (2013.01); *B25H 3/04* (2013.01)

(58) Field of Classification Search
None
See application file for complete search history.

(56) References Cited

U.S. PATENT DOCUMENTS

| | | | | |
|---|---|---|---|---|
| 619,186 | A * | 2/1899 | Kingsbury | 211/22 |
| 653,519 | A * | 7/1900 | Masters | 211/22 |
| 3,355,136 | A | 11/1967 | Staples | |
| 3,934,436 | A * | 1/1976 | Candlin et al. | 70/234 |
| 3,990,279 | A * | 11/1976 | Brickel | 70/233 |
| 4,086,795 | A * | 5/1978 | Foster et al. | 70/233 |
| 4,212,175 | A * | 7/1980 | Zakow | 70/58 |
| D281,199 | S | 10/1985 | Prawl | |
| 4,807,453 | A * | 2/1989 | Bernier et al. | 70/233 |
| 4,920,334 | A * | 4/1990 | DeVolpi | 340/568.4 |
| 4,966,382 | A * | 10/1990 | Giles | 280/288.4 |
| 5,065,921 | A | 11/1991 | Mobley | |
| 5,094,373 | A | 3/1992 | Lovci | |
| 5,119,649 | A | 6/1992 | Spence | |
| 5,129,559 | A | 7/1992 | Holliday | |
| 5,141,211 | A * | 8/1992 | Adams, Jr. | 269/16 |
| 5,190,195 | A | 3/1993 | Fullhart et al. | |
| 5,373,978 | A * | 12/1994 | Buttchen et al. | 224/510 |
| 5,513,508 | A | 5/1996 | Saunders et al. | |
| 5,752,416 | A | 5/1998 | Nien | |
| 5,765,821 | A * | 6/1998 | Janisse et al. | 269/16 |
| 5,815,873 | A * | 10/1998 | Jones | A46B 15/0055 15/106 |
| 6,006,555 | A | 12/1999 | Shu-Fen | |
| 6,216,319 | B1 * | 4/2001 | Elkins | A45F 5/00 224/221 |
| 6,487,756 | B1 * | 12/2002 | Vidal, Jr. | A45F 5/004 24/3.1 |

(Continued)

*Primary Examiner* — Monica Millner
(74) *Attorney, Agent, or Firm* — McAndrews, Held & Malloy, Ltd.

(57) ABSTRACT

One bicycle service kit includes: a main body; at least one slot formed at an upper end of the main body; and at least one cable positioned in the slot, the cable including a head portion held within an interior of the main body, the head portion having a dimension larger than a width of the slot, the cable including a free end configured to be attached to a bicycle tool. Another kit includes: a circular main body defining an open interior; a shelf formed in the open interior of the main body, the shelf defining a plurality of slots; at least one cable positioned in at least one of the slots, the cable including a free end configured to be attached to a bicycle tool; and a front cover coupled to close the open interior of the main body.

20 Claims, 13 Drawing Sheets

(56) References Cited

U.S. PATENT DOCUMENTS

| | | | | |
|---|---|---|---|---|
| 7,227,467 | B2 * | 6/2007 | Feibelman | 340/568.2 |
| 7,337,638 | B1 | 3/2008 | Tierney | |
| 7,571,628 | B2 * | 8/2009 | D'Anieri | 70/234 |
| 8,065,895 | B2 * | 11/2011 | Andersen | 70/14 |
| 8,146,785 | B2 * | 4/2012 | Pruitt | B25B 23/00<br>224/219 |
| 8,403,132 | B2 * | 3/2013 | Moreau | A45F 5/021<br>206/234 |
| 8,596,102 | B2 | 12/2013 | Loughlin et al. | |
| 8,627,774 | B2 | 1/2014 | Pearce | |
| 2006/0163412 | A1 * | 7/2006 | Szarkowski | B65H 75/4434<br>242/384 |
| 2007/0095870 | A1 * | 5/2007 | Griffith | A45C 13/30<br>224/219 |
| 2008/0163464 | A1 * | 7/2008 | Baumann | A45F 5/02<br>24/3.12 |
| 2009/0201127 | A1 * | 8/2009 | Stobbe et al. | 340/5.6 |
| 2010/0228405 | A1 * | 9/2010 | Morgal et al. | 701/2 |
| 2010/0245128 | A1 * | 9/2010 | Kanof | 340/932.2 |
| 2010/0313614 | A1 * | 12/2010 | Rzepecki | 70/233 |
| 2013/0219705 | A1 * | 8/2013 | Scholtz et al. | 29/650 |

* cited by examiner

BICYCLE SERVICE KITS

RELATED APPLICATION

This application is claims priority to U.S. patent application Ser. No. 13/842,491, filed on Mar. 15, 2013. This application is also related to U.S. patent application Ser. No. 13/781,680 filed on Feb. 28, 2013, the entirety of which is hereby incorporated by reference.

BACKGROUND

Bicycles are a popular form of transportation. As the highways become more congested and green technologies are encouraged, more individuals are deciding to use their bicycles for commuting. As a mode of transportation, bicycles are relatively simple devices. However, there are times when bicycles must be serviced. In some instances, repair is necessary when a bicycle is away from the individual's residence or bicycle shop.

SUMMARY

In one non-limiting aspect, a bicycle service kit includes: a main body extending vertically from a base; at least one slot formed at an upper end of the main body; and at least one cable positioned in the slot, the cable including a head portion held within an interior of the main body, the head portion having a dimension larger than a width of the slot, the cable including a free end configured to be attached to a bicycle tool.

In another non-limiting aspect, a bicycle service kit includes: a circular main body defining an open interior; a shelf formed in the open interior of the main body, the shelf defining a plurality of slots; at least one cable positioned in at least one of the slots, the cable including a head portion held within the open interior of the main body, the head portion having a dimension larger than a width of the slot, the cable including a free end configured to be attached to a bicycle tool; and a front cover coupled to close the open interior of the main body.

DETAILED DESCRIPTION

Figure 1:
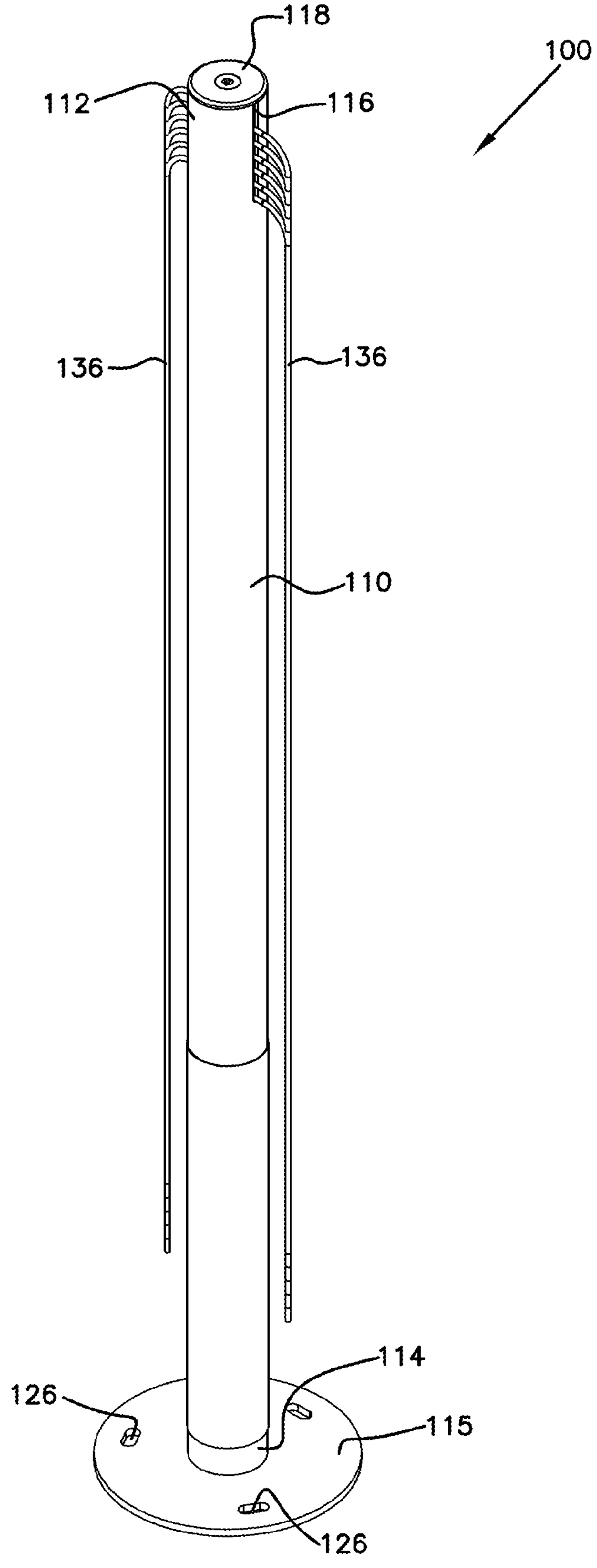
FIG. 1 is a perspective view of an example bicycle service kit.
Figure 2:
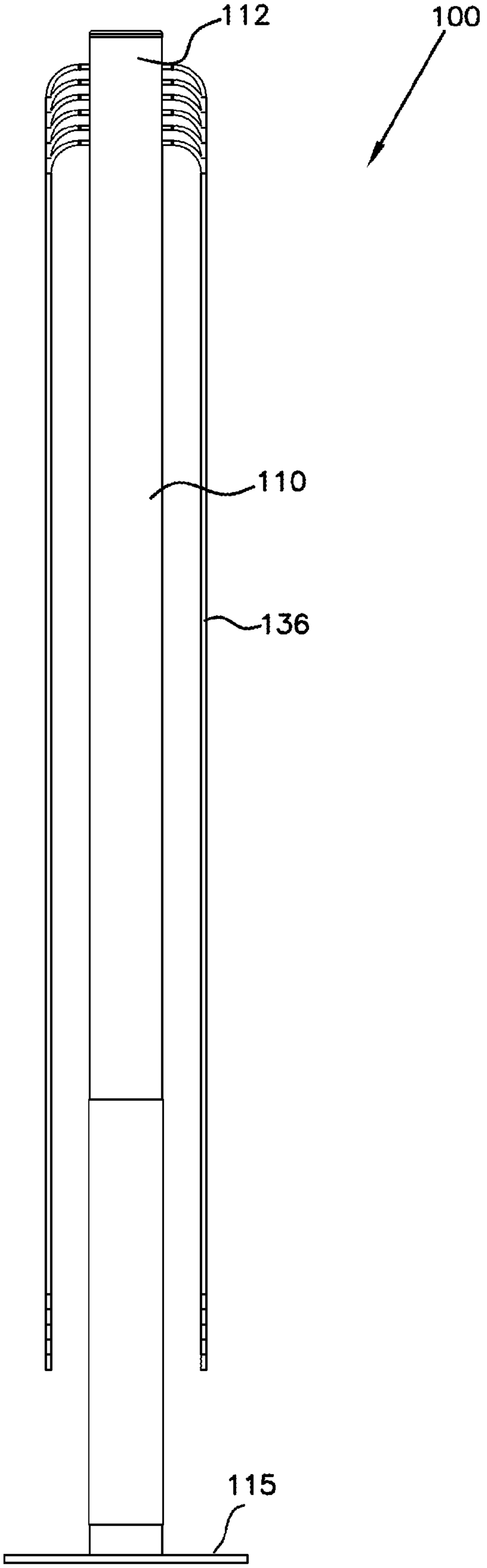
FIG. 2 is a front view of the bicycle service kit of FIG. 1.
Figure 3:
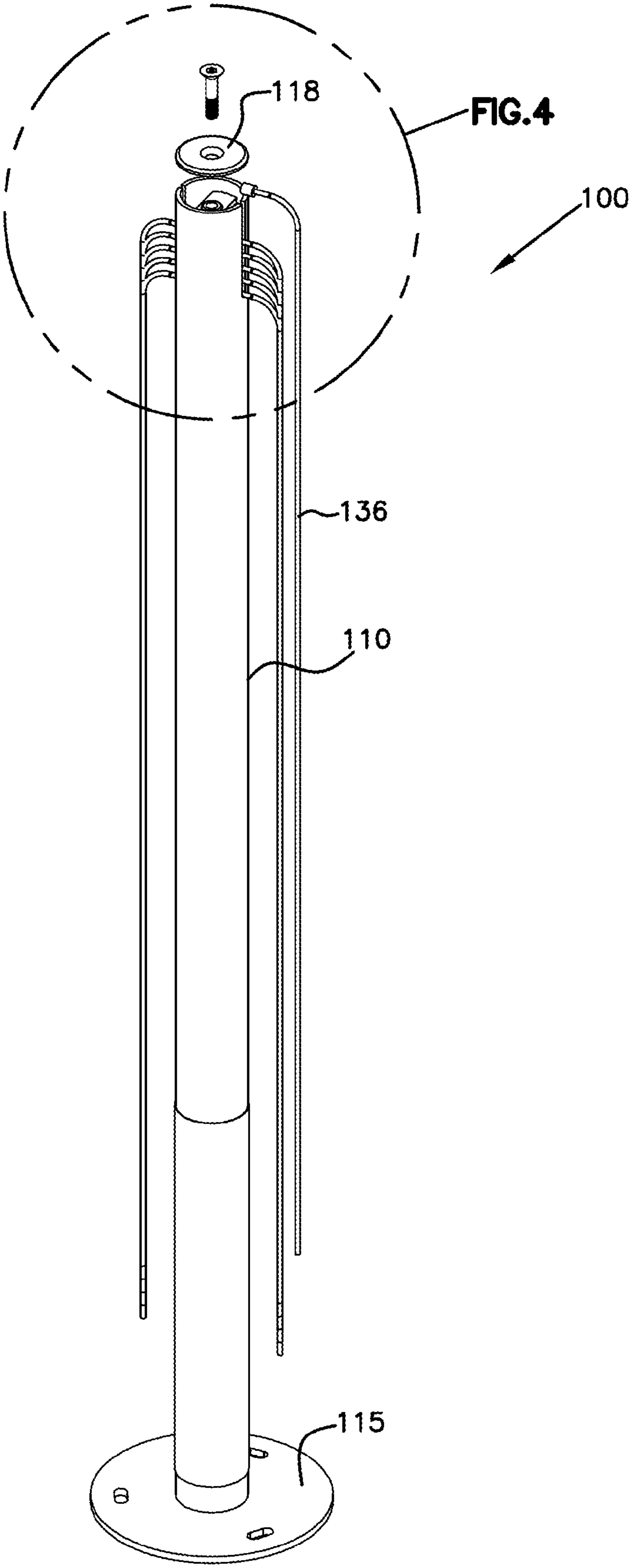
FIG. 3 is a partially exploded perspective view of the bicycle service kit of FIG. 1.
Figure 4:
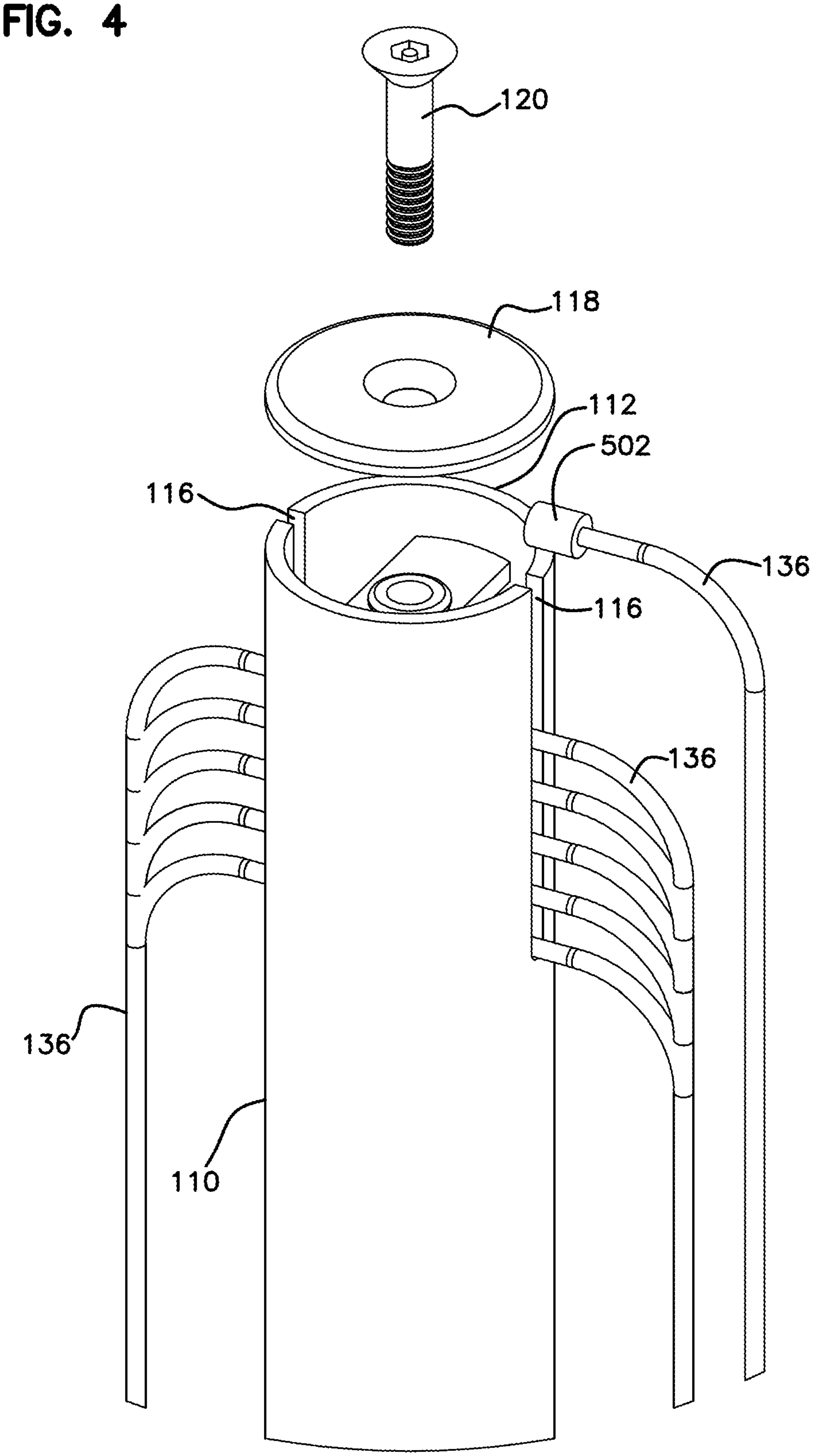
FIG. 4 is an enlarged perspective view of the bicycle service kit of FIG. 3.

The present disclosure relates generally to bicycle service kits. In example embodiments, the bicycle service kits provide a plurality of components that allow one to service (e.g., repair and/or maintain) a bicycle or similar device. In some examples, the bicycle service kits are configured to allow the bicycle service kits to be located in an urban environment, such as along a bicycle path, so that riders can conveniently perform service as required while using the bicycles.

Referring now to FIGS. 1-5, a first example bicycle service kit 100 is shown.

The bicycle service kit 100 includes an example main body 110 having a first end 112 and a second end 114. In this example, the main body 110 is a cylindrical tube, although other shapes can be used, such as rectangular, oblong, etc. shapes or other structures can comprise the main body 110.

In one example embodiment, the main body 110 is hollow and forms slots 116 at the first end 112. In this example, two slots 116 are formed on opposite points along the main body 110. However, more or fewer slots 116 could be used.

Positioned within the slots 116 is a plurality of cables 136 with a plurality of tools 138 affixed thereto. See FIG. 15. Examples of such tools include assorted screwdrivers, wrenches (e.g., Allen wrenches), tire levers, etc. However, other tools and service products can be used, such as lubricants, tire plugs, etc. The cables 136 allow one or more of the tools 138 to be extended from the main body 110 for use in servicing a bicycle, while assuring that the tools 138 are not lost or stolen. In this example, the tools 138 mounted to the bicycle service kit 100 include: Philips and flat head screwdrivers; 2.5, 3, 4, 5, 6, 8 mm Allen wrenches; Headset wrench; Pedal wrench; 8, 9, 10, 11 mm box wrenches; and Tire levers.

In this example, the cables 136 are positioned within the slots 116 during assembly. See FIG. 4. In this configuration, the cables 136 each include a head portion 502. The cables 136 are extended through the slots 116 formed in the main body 110. The head portion 502 of each cable 136 is larger than the slots 116, so that the head portion 502 cannot fit through the slots 116, thereby suspending the cables 136 from the main body 110.

When the cables 136 have been inserted into the slots 116, a cap 118 is positioned on the first end 112 of the main body 110, and a bolt 120 is used to couple the cap 118 to the first send 112. The bolt 120 includes a special head that resists removal without a special tool. In this manner, the cables 136 are secured so that tampering of the cables 136 is not possible, since the cap 118 cannot be easily removed.

Such a configuration is advantageous to protect the cables 136 from detachment and/or tampering of the cables 136. In other embodiments, the tools 138 may be connected to retractable cables that, when not in use, retract into an interior portion of the main body 110. The tools 138 may also include magnets thereon to hold the tools to the main body 110 when not being used or to prevent them from interfering with use of other tools.

In one alternative, the first end 112 can be rotatably-mounted to the main body 110 so that the first end 112 can be rotated about an axis of the main body 110. For example, the slots 116 on the first end 112 can be rotated into the 3, 6, and 9 o'clock positions to optimize how the cables 136 with the tools 138 from the main body 110. In a same or another alternative, the first end 112 can include one or more supports that extend upward from the main body 110 to allow a height at which the first end 112 is positioned to be adjusted. In this manner, the bicycle service kit 100 can be configured to service bikes of different sizes and accommodate users of different heights.

The second end 114 of the main body 110 defines a base 115 upon which the bicycle service kit 100 can be mounted. For example, the base 115 includes a plurality of holes 126 through which bolts 122 can be extended to affix the bicycle service kit 100 to the ground.

Figure 5:
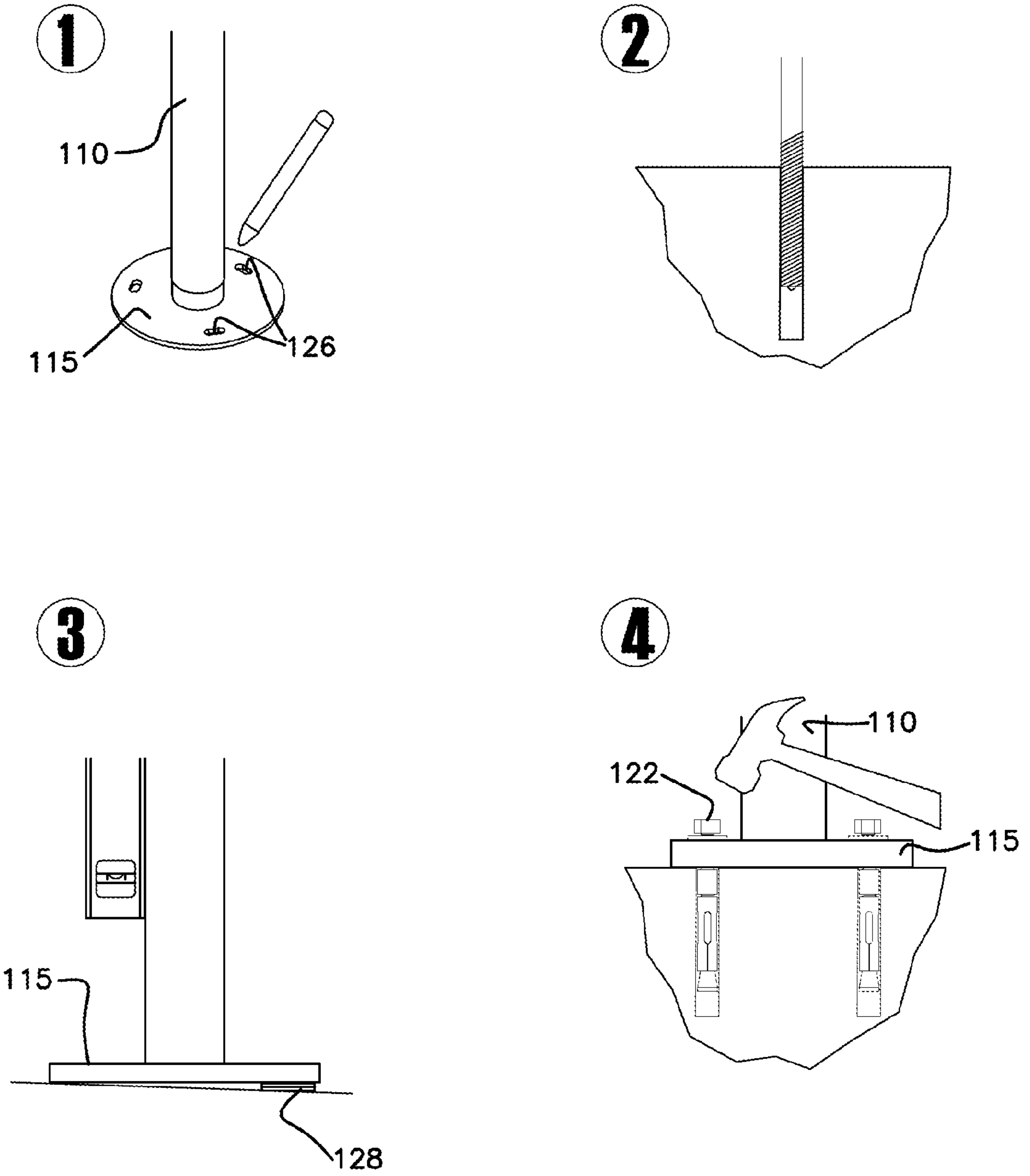
FIG. 5 is a schematic view of an installation process for the bicycle service kit of FIG. 1.
Figure 6:
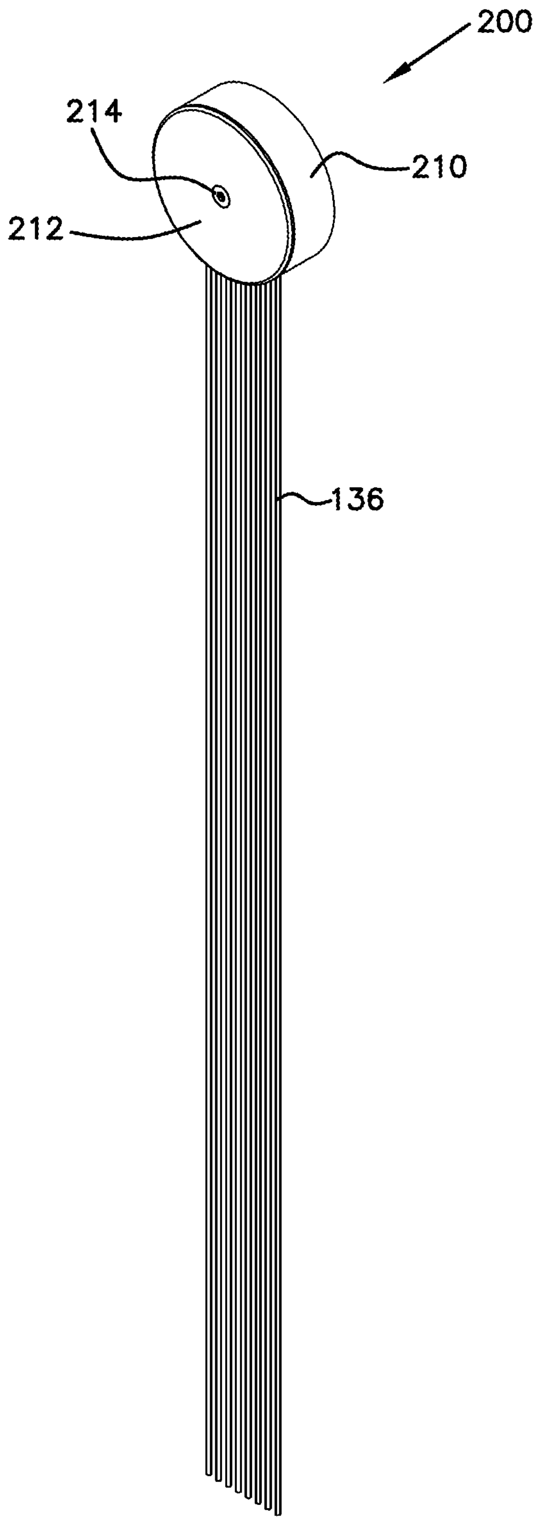
FIG. 6 is a perspective view of another example bicycle service kit.
Figure 7:
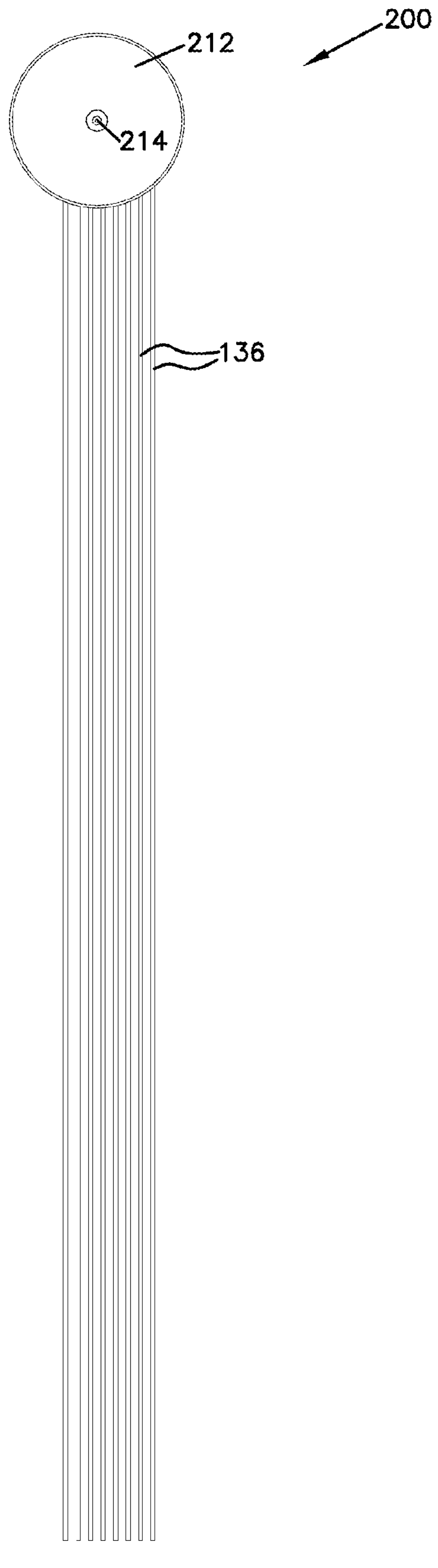
FIG. 7 is a front view of the bicycle service kit of FIG. 6.
Figure 8:
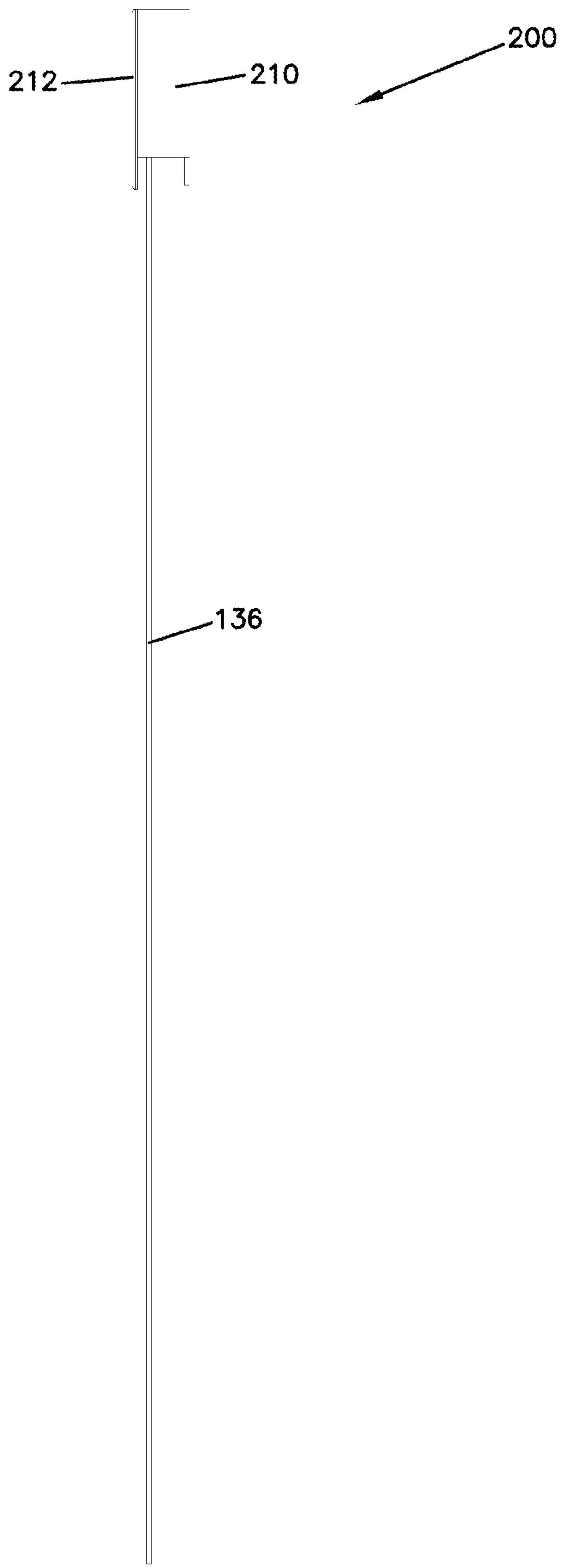
FIG. 8 is a side view of the bicycle service kit of FIG. 6.
Figure 9:
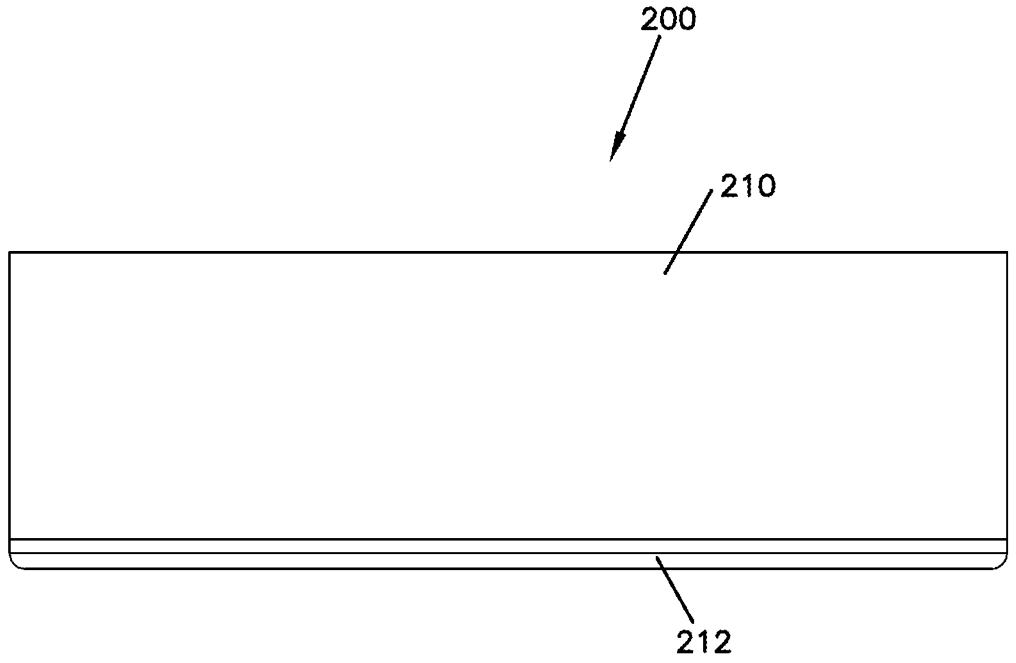
FIG. 9 is a top view of the bicycle service kit of FIG. 6.
Figure 10:
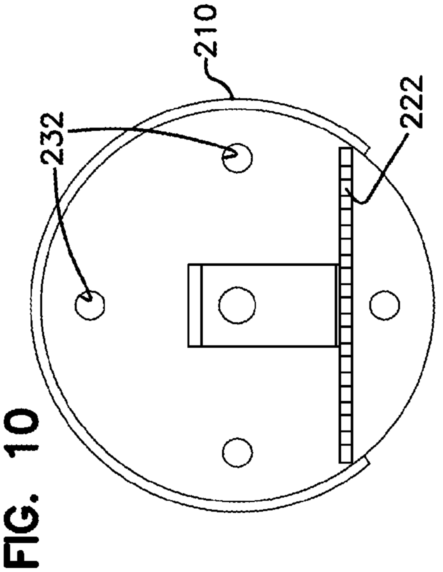
FIG. 10 is a front view of a main body of the bicycle service kit of FIG. 6.
Figure 11:
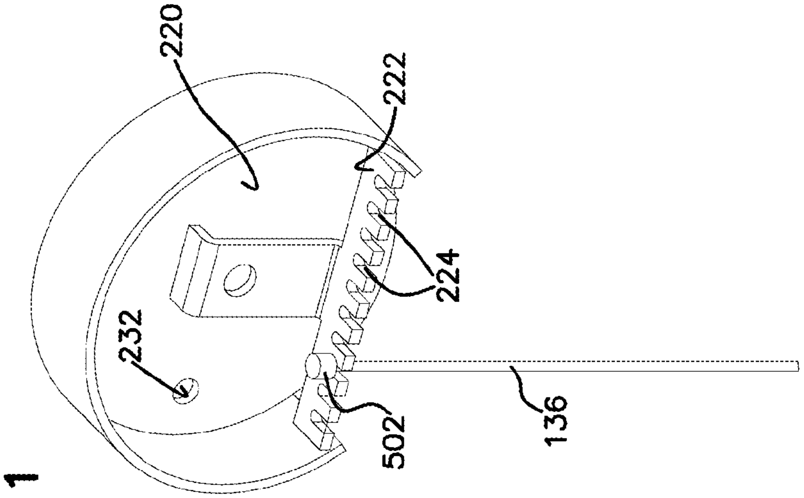
FIG. 11 is a perspective view of a main body of FIG. 10.

For example, a process for installing the bicycle service kit 100 is shown in FIG. 5. Initially, at step 1, the base 115 is used as a template to mark the holes 126 at the location for installation. Next, at step 2, the bicycle service kit 100 is removed, and the holes are drilled.

At step 3, the bicycle service kit 100 is replaced and leveled. One or more washers 128 can be positioned under the base 115 to level the bicycle service kit 100. Finally, at step 4, the bolts 122 are positioned through the holes 126 to affix the bicycle service kit 100 to the place of installation. In these examples, the bicycle service kit 100 is permanently affixed so that it is not meant to be moved by users of the bicycle service kit 100.

In the example shown, the main body 110 is formed from 2 inch sch. 40 pipe. The cap 118 is a 3⁄16" inch plate. The base 115 is 8 inches in diameter and 0.25 inches in thickness. The cables 136 are 5⁄32 inch stainless steel cable. Other dimensions can be used.

The bicycle service kit 100 can include a hot-dipped galvanized finish performed after fabrication. In addition, a plurality of TGIC powder-coated colors can be used to personalize the bicycle service kit 100.

Referring now to FIGS. 6-14, a second example bicycle service kit 200 is shown.

The bicycle service kit 200 includes an example main body 210 having an open interior 220. See FIGS. 10-13. In this example, the main body 110 is a circular, although other shapes can be used, such as rectangular, oblong, etc. shapes or other structures can comprise the main body 110.

The bicycle service kit 200 is configured to be mounted to a wall or other structure. In this example, the interior 220 of the main body 210 defines a plurality of openings 232 through which a screw, nail or other fastener can be placed to affix the main body 210 to the wall. In some examples, the main body 210 is mounted at a desired height from the ground, such as 54 inches. However, the height can be increased or decreased depending on the application.

Once in place on the wall or other structure, a plurality of the cables 136 is suspended from the main body 210. As shown in FIGS. 10-13, a shelf 222 including a plurality of slots 224 is positioned within the interior 220 of the main body 210. The cables 136 are suspended by placing the cables 136 within the slots 224 and allowing the head portion 502 to abut the shelf 222. The head portion 502 is too large to fit through the slots 224, thereby suspending the cables 136 from the main body 110.

Once the cables 136 are in place, a front cover 212 is positioned onto the main body 210 and affixed thereto with a tamper-resistant bolt 214. After the front cover 212 is attached, the cables 136 cannot be easily removed from the main body 210, since the front cover 212 closes off the slots 224 formed by the shelf 222. This makes the bicycle service kit 200 resistant to tampering.

In this example, the tools 138 suspended from the cables 136 of the bicycle service kit 200 include: Philips and flat head screwdrivers; 2.5, 3, 4, 5, 6, 8 mm Allen wrenches; Headset wrench; and Pedal wrench. More or fewer tools can be provided.

In this example, the main body 210 is a 6.308×0.154 inch tube, with a 3⁄16 inch plate. The bicycle service kit 200 can likewise be finished in a manner similar to that described above.

Figure 14:
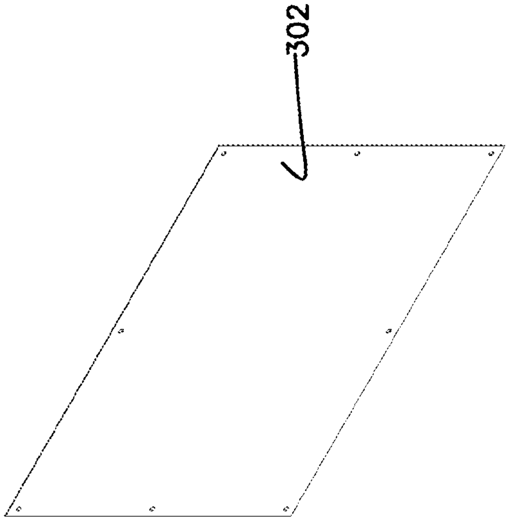
FIG. 14 is a perspective view of a protective plate.
Figure 12:
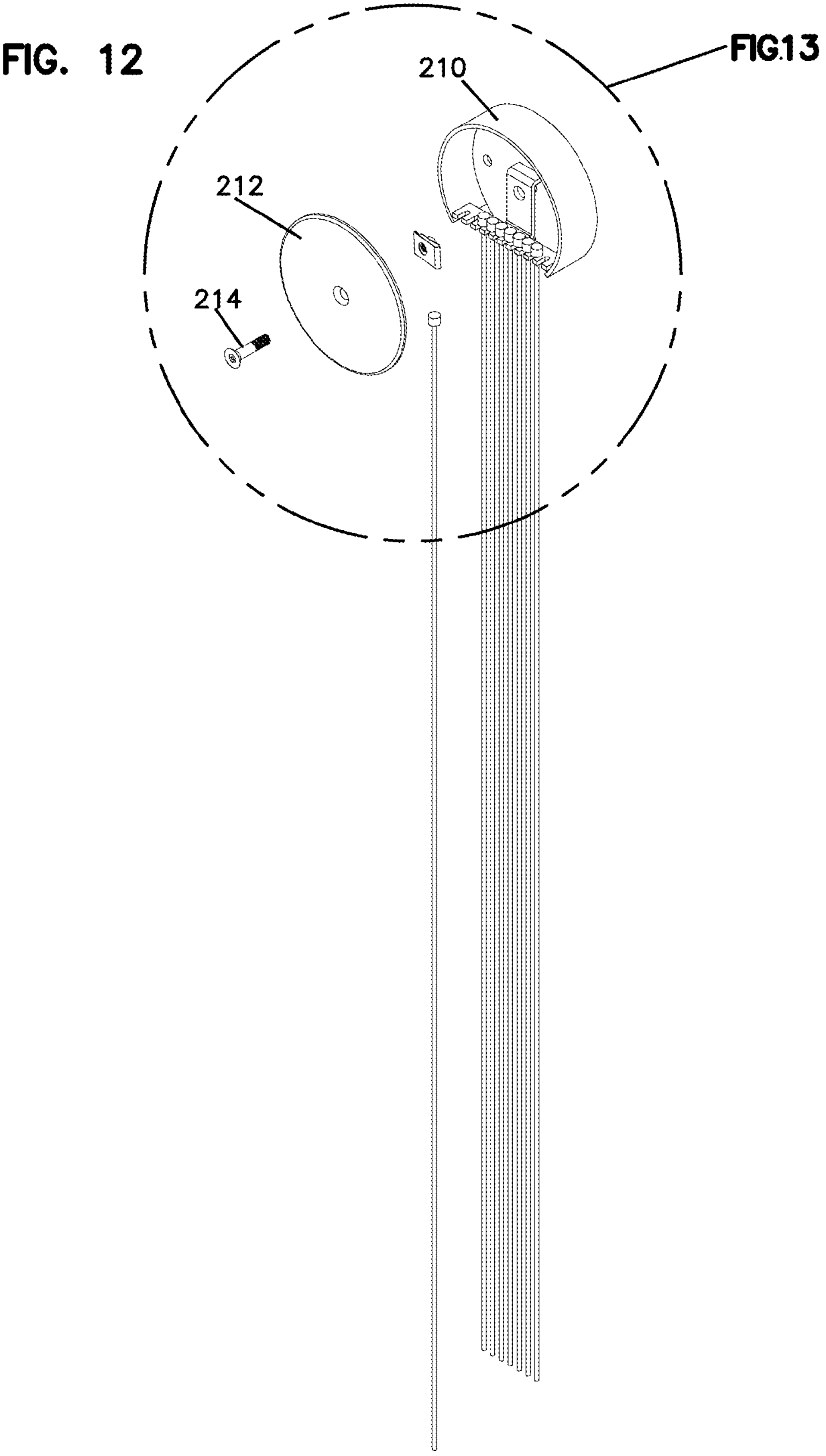
FIG. 12 is an exploded perspective view of the bicycle service kit of FIG. 6.
Figure 13:
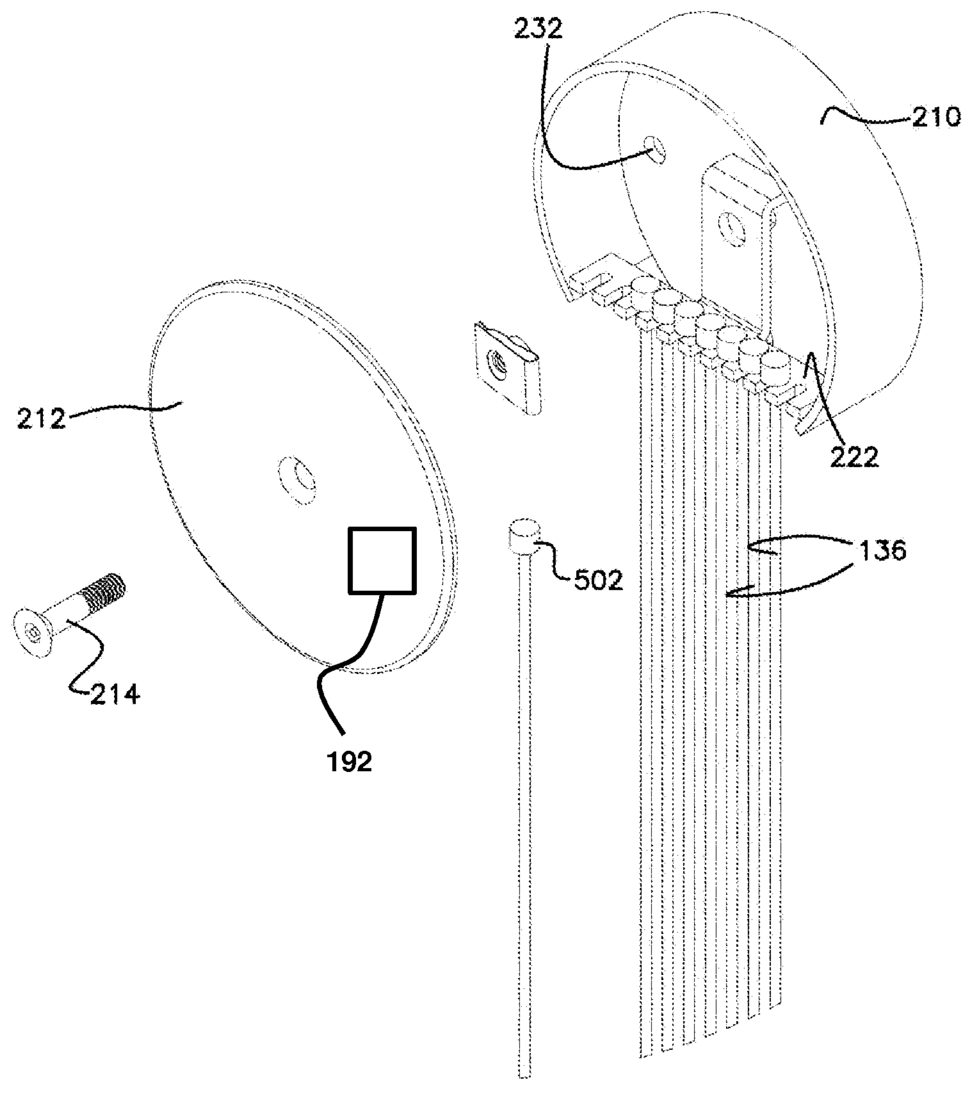
FIG. 13 is an enlarged view of a portion of the bicycle service kit of FIG. 12.

As shown in FIG. 14, a protective plate 302 can be affixed to the wall at an approximate height of the tools 138 when suspended so that the tools 138 to not markup the wall. In this example, the plate 302 is made of metal or another durable material that can protect the wall should the tools 138 be swung back or released at an elevation so that the tools swing back towards the wall.

Figure 15:
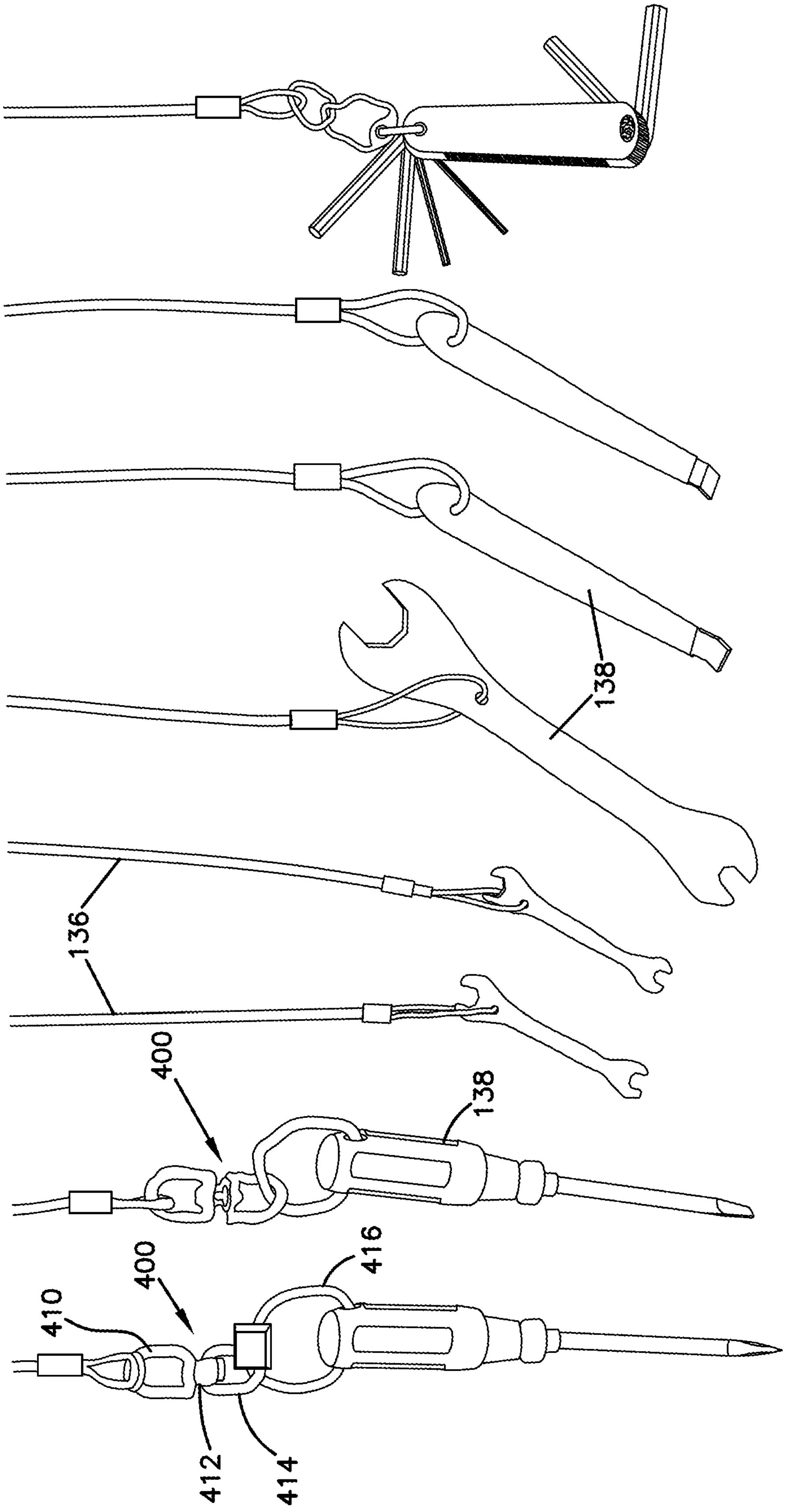
FIG. 15 is a front view of example tools of a bicycle service kit.

Referring now to FIG. 15, in this example, some of the tools 138 are connected to the cables 136 using a swivel member 400 that allows the tools 138 to be freely rotated, as necessary, during use. In this example, the swivel member 400 includes a first portion 410 defining a loop that is coupled to the cable 136. The first portion 410 is coupled to a second portion 414 through a swivel 412 that allows the first portion 410 to rotate freely relative to the second portion 414. The second portion 414 is, in turn, coupled to the tools. In this example, the second portion 414 defines a loop through which a cable 416 that is connected to the tool 138 extends.

In some examples, such as that depicted in FIG. 15, only those tools that are typically twisted during use (e.g., screwdrivers and Allen wrenches) are provided on swivels. In other examples, most or all of the tools are provided with swivels. In this configuration, the tools 138 can be easily used without causing the cables 136 to become twisted. Other similar configurations are possible.

In some examples, the bicycle tool kits 100, 200 are used in conjunction with other components, such as an air pump. Such an air pump could be freestanding or affixed to a structure. The air pump can be used to service bicycle tires, and can include such features as a pressure gauge.

In other designs, one or both of the bicycle service kits 100, 200 include a QR code 192, such as affixed to a main body thereof. The QR code 192 can be read by computers and smartphones. The QR code can provide information, such as links to videos and/or instructions on bike maintenance. For example, the QR code can be read by a user's smartphone, and the result can be to provide the user with a video on how to change a flat tire on a bicycle, using the tools 138 provided by the bicycle service kit 100. Multiple QR codes or similar information can be provided.

There are various advantages associated with the bicycle service kits described herein. For example, the kits provide a self-contained unit that can be used to service many aspects of a bicycle. This includes both service of the mechanical aspects of the bicycle, as well as the tires (e.g., by providing air to the tires). This is accomplished with a minimal footprint associated with the bicycle service kits, since all components of the bicycle service kits are integrally-formed when installed.

In another advantage, the various components of the bicycle service kits are securely attached to minimize the possibility of tampering or damage to the components. For example, the cables are attached to the tools and the main body in such a manner to resist removal of the tools, while allowing maximum workability for the tools.

The various embodiments described above are provided by way of illustration only and should not be construed as limiting. Various modifications and changes may be made to the example embodiments and applications illustrated or described herein or below without departing from the true spirit and scope of the disclosure.

What is claimed is:

1. A bicycle service kit, comprising:

a main body, an interior of the main body comprising a shelf, and the shelf defining one or more slots;

one or more cables, each cable including a head portion having a dimension larger than a width of the slot, and a free end configured to be attached to a bicycle tool; the head portions of the one or more cables being held within an interior of the main body by an abutment between the head portion of the cable and the shelf;

one or more bicycle tools attached to the free end of at least one of the one or more cables; and a cover coupled to the main body, closing the interior of the main body.

2. The bicycle service kit of claim 1, in which the main body is configured to be mounted to a wall.

3. The bicycle service kit of claim 2, further comprising a protective wall plate.

4. The bicycle service kit of claim 1, in which the shelf defines a plurality of slots, each one of the plurality of slots being configured for the positioning of one of a plurality of cables.

5. The bicycle service kit of claim 1, in which the cover is configured to require a special tool for removal.

6. The bicycle service kit of claim 1, wherein at least one of the one or more cables comprises a swivel, such that the bicycle tool can rotate freely without the cable becoming twisted.

7. The bicycle service kit of claim 1, wherein the main body is substantially circular.

8. The bicycle service kit of claim 1, wherein the main body is substantially rectangular.

9. The bicycle service kit of claim 1, wherein at least one of the one or more cables is retractable.

10. The bicycle service kit of claim 1, wherein at least one of the one or more bicycle tools is attached to the free end of the cable in a manner that prevents removal of the tool from the cable.

11. The bicycle service kit of claim 1, wherein the one or more bicycle tools are selected from screwdrivers, wrenches, tire levers, lubricants, tire plugs, and combinations thereof.

12. The bicycle service kit of claim 1, wherein the one or more bicycle tools comprise at least one Phillips head screwdriver, at least one flat head screwdriver, at least one Allen wrench, at least one Headset wrench, and at least one Pedal wrench.

13. The bicycle service kit of claim 12, wherein the one or more bicycle tools further comprise at least one box wrench.

14. The bicycle service kit of claim 12, wherein the one or more bicycle tools further comprise at least one tire lever.

15. The bicycle service kit of claim 1, further comprising a computer-readable code configured to direct a user to information related to the use of the bicycle service kit.

16. The bicycle service kit of claim 15, wherein the computer-readable code comprises a QR code.

17. The bicycle service kit of claim 1, wherein at least one of the one or more cables is non-retractable.

18. The bicycle service kit of claim 1, wherein the bicycle service kit is mounted to a wall.

19. A bicycle service kit, comprising:

a main body mounted to a wall;

an interior of the main body comprising a shelf, and the shelf defining a plurality of slots;

a plurality of cables, each cable including a head portion having a dimension larger than a width of one of the plurality of slots, and a free end attached to a bicycle tool;

wherein each of the plurality of cables is held within the interior of the main body by an abutment between the head portion of the cable and the shelf; and a cover coupled to the main body and closing the interior of the main body.

20. The bicycle service kit of claim 19, in which the plurality of cables are non-retractable.

* * * * *